M. PIANKO.
TIRE ARMOR.
APPLICATION FILED FEB. 26, 1920.

1,382,381.

Patented June 21, 1921.
2 SHEETS—SHEET 1.

M. Pianko, Inventor

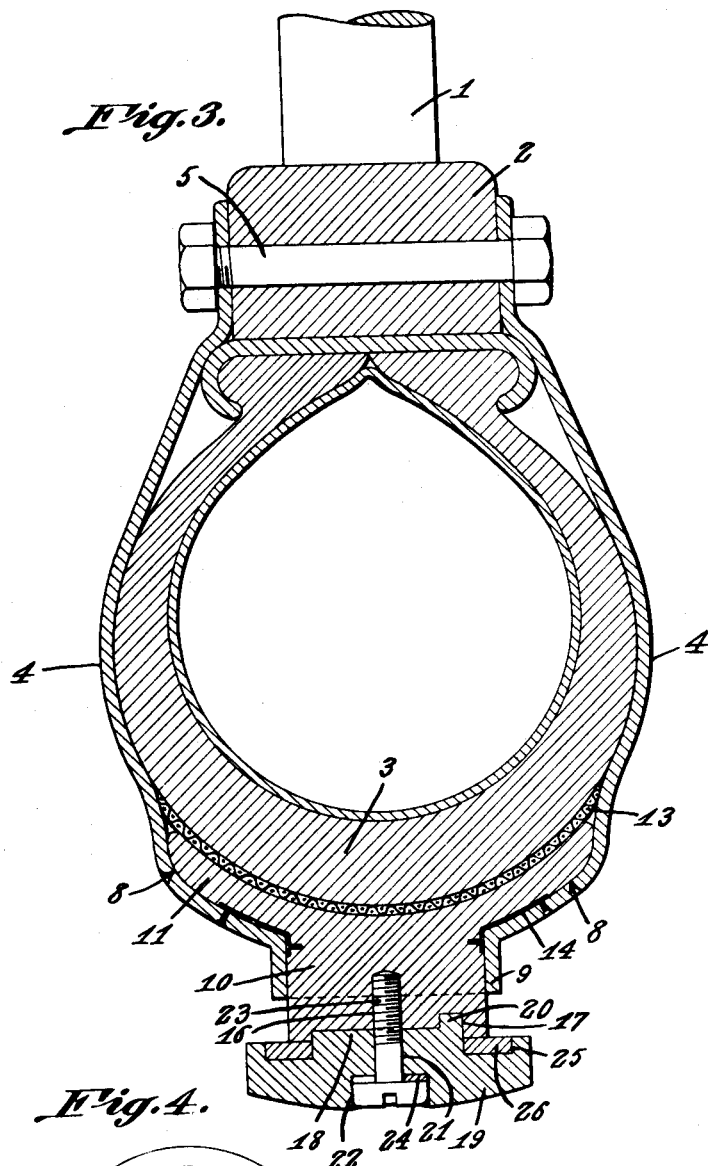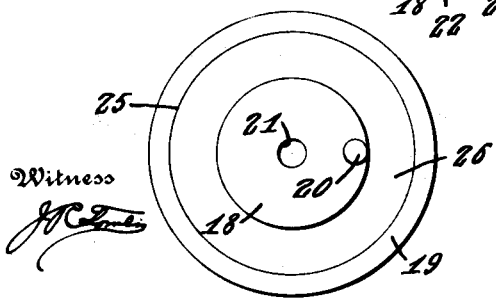

UNITED STATES PATENT OFFICE.

MENDEL PIANKO, OF CHICAGO, ILLINOIS.

TIRE-ARMOR.

1,382,381. Specification of Letters Patent. Patented June 21, 1921.

Application filed February 26, 1920. Serial No. 361,465.

*To all whom it may concern:*

Be it known that I, MENDEL PIANKO, a citizen of the United States, residing at Chicago, in the county of Cook and State of Illinois, have invented a new and useful Tire-Armor, of which the following is a specification.

This invention relates to vehicle tires and more especially to an armor for use in connection with ordinary pneumatic tires whereby the tires will be protected at all times from wear and tear due to direct contact with the surface of the ground and can, at the same time, be subjected to a much higher internal air pressure than would otherwise be possible.

A further object is to provide the armor with tread members mounted for radial movement and which are held normally projected by the pressure of the inflated tire thereagainst, these members being adapted to move inwardly against the tire when supporting the load, thus to provide the same resiliency for the wheel as when the pneumatic tire is contacting directly with the ground.

A further object is to provide a structure of this character in which the tread members can have their wear portions renewed when necessary and which will operate to properly support the wheel even though the pneumatic portion of the tire should become deflated.

Another object is to provide a structure of this character which can be applied readily to tires already in use and which will also enable the heavy expensive tires in ordinary use to be dispensed with and lighter ones substituted, these lighter tires operating efficiently under heavy loads because of the reinforcing armor or housing used in connection therewith.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Fig. 3 is an enlarged transverse section on line 3—3, Fig. 1.

Fig. 4 is an inner elevation of one of the wear edges.

Figure 1:
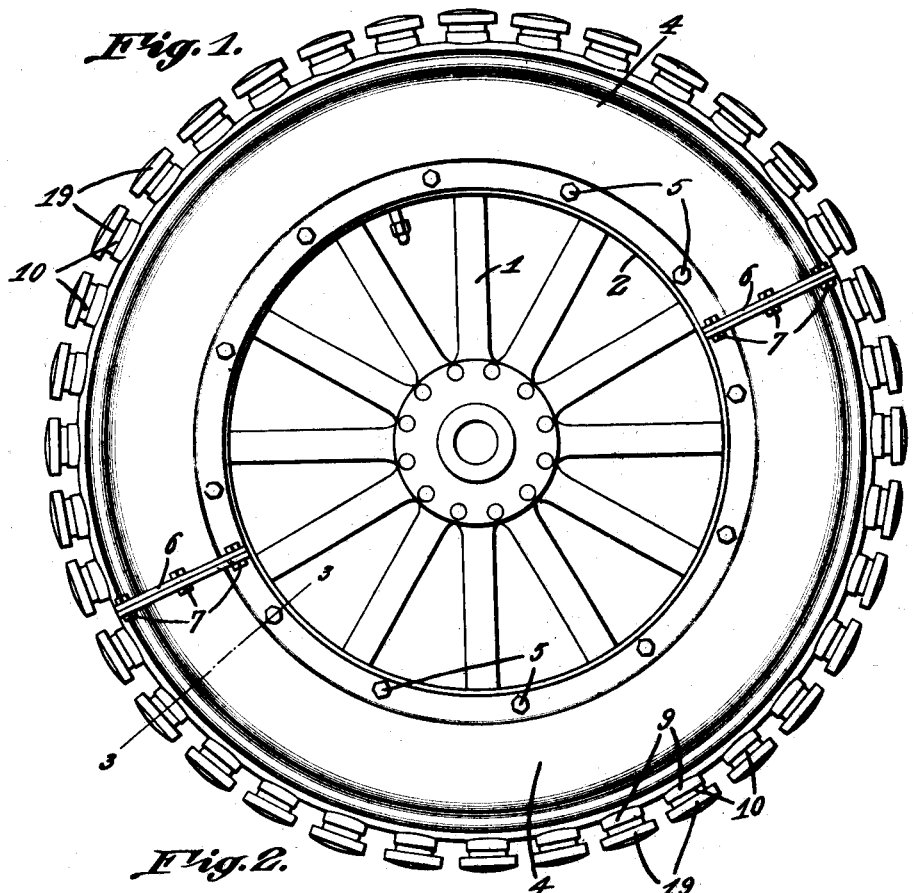
Figure 1 is a side elevation of a wheel having the present improvements combined therewith.
Figure 2:
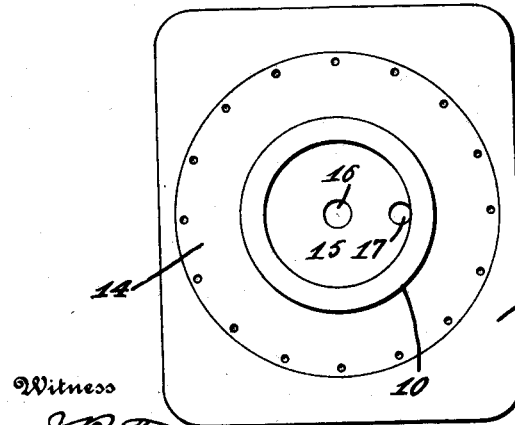
Fig. 2 is an outer end elevation of one of the tread members with its wear edge removed.

Referring to the figures by characters of reference 1 designates a wheel of ordinary construction the rim 2 of which has a pneumatic tire 3 mounted thereon in the usual manner. The armor constituting the present invention consists of opposed arcuate channeled members 4 formed of metal and which, when assembled end to end, completely house the tire, the side edges of the members being fastened to the sides of the rim 2 by bolts 5 or in any other suitable manner. Laterally extending end flanges 6 are formed with the members 4 and are adapted to be bolted together as shown at 7 or secured in any other manner desired.

The outer peripheral portion of the housing or casing made up of the members 4 is formed with a broad interior channel extending continuously therearound, as indicated at 8. Extending outwardly from this channel at regular intervals are guide sleeves 9 disposed in an annular series. Slidably mounted in each sleeve is the neck portion 10 of a tread member, this neck portion projecting outwardly from a transversely bowed inner plate 11 which rests normally within the channel 8. The inner concave surface of the plate 11 constitutes a bearing for the peripheral portion of the pneumatic tire 3 which is housed within the casing. An interlining 13 may be interposed between the plate 11 and the tire 3. Furthermore, if desired, a flexible diaphragm 14 can be interposed between the neck 10 and the wall of the channel 8, this diaphragm being fastened to said neck and wall respectively so as to seal the interior of the armor against the admission of dust and the like.

Formed in the outer end of the neck 10 is a circular recess 15 having a central threaded bore 16 and a shallow recess or notch 17 arranged off-center. The recess 15 is adapted to receive a boss 18 extending from the center of a head 19, there being a projection 20 upon the boss adapted to be seated in the recess or notch 17. An opening 21 extends through the head and has its outer end counterbored as shown at 22. Extending through this opening 21 is an attaching screw 23 which enters the recess 15, thus to fasten the head 19 to the neck 10. The head of the screw 23 is seated within the counterbore 22 and a spring washer 24 is preferably interposed between this head and the inner end of the counterbore. A circular channel 25 may be provided in the back face of the head and around the boss 18, this channel holding a gasket 26 of rubber or the like. This gasket projects radially beyond the neck 10 and is adapted, should the head 19 move inwardly a predetermined distance, to come into contact with the end of the guide sleeve 9 in the path thereof, thus to form a supplemental cushion.

It will of course be understood that the various tread members can be assembled with the members 4 by first removing their heads 19 and then inserting the necks 10 outwardly into the sleeves 9 after which the heads 19 are secured in place. The sections or members 4 are then placed on the pneumatic tire, which can be of the usual type, and are fastened together at their ends and are also fastened to the sides of the rim 2. The tire 3 is then inflated in the usual manner and the casing of the tire will press outwardly against the members 4 and also against the plate 11, thus holding said plate pressed tightly against the wall of the channel 8 and also holding the wear heads 19 in their outermost positions. When the wheel is in use the gaskets 26 will come successively into contact with the supporting surface and will thrust upwardly against the inflated tire which, therefore, will constitute a pneumatic cushion for each plate 11, resisting the inward movement of the necks and providing the desired cushioning effect.

As the tire is arranged within a non-yielding housing, it can be inflated with air under a higher pressure than ordinarily without, however, necessitating the use of tires of more than the ordinary strength. As a matter of fact lighter tires than would otherwise be practical can be employed.

What is claimed is:

1. A device of the class described including a non-resilient housing, means for securing the housing to a wheel rim and about a pneumatic tire mounted on the rim, radial guide sleeves upon the peripheral portion of the housing, a neck slidably mounted within each sleeve, a plate at the inner end of the neck adapted to be pressed outwardly by the inflated pneumatic tire, and a wear head upon the outer end of the neck.

2. A device of the class described including a non-resilient housing, means for securing the housing to the rim of a wheel and around a tire mounted on the rim, radially movable tread members carried by the peripheral portion of the housing and normally pressed outwardly by the tire within the housing, and a flexible diaphragm connecting each of the tread members to the housing.

3. The combination with a non-resilient housing and means for attaching the same to a wheel rim and about a tire upon the rim, of radial guide sleeves upon the peripheral portion of the housing, tread members slidably mounted in said sleeves and held normally pressed outwardly by the tire within the casing, a wear head constituting the outer portion of each tread member, and a supplemental cushioning element carried by each tread member against the adjacent guide sleeve when the tread member is relieved of the pressure of the tire.

In testimony that I claim the foregoing as my own, I have hereto affixed my signature in the presence of two witnesses.

MENDEL PIANKO.

Witnesses:
IVY E. SIMPSON,
AGNES ROCKELLI.